S. BRUCKMAN.
SEED PLANTER.
APPLICATION FILED DEC. 17, 1912.
1,083,185.
Patented Dec. 30, 1913.
2 SHEETS—SHEET 2.
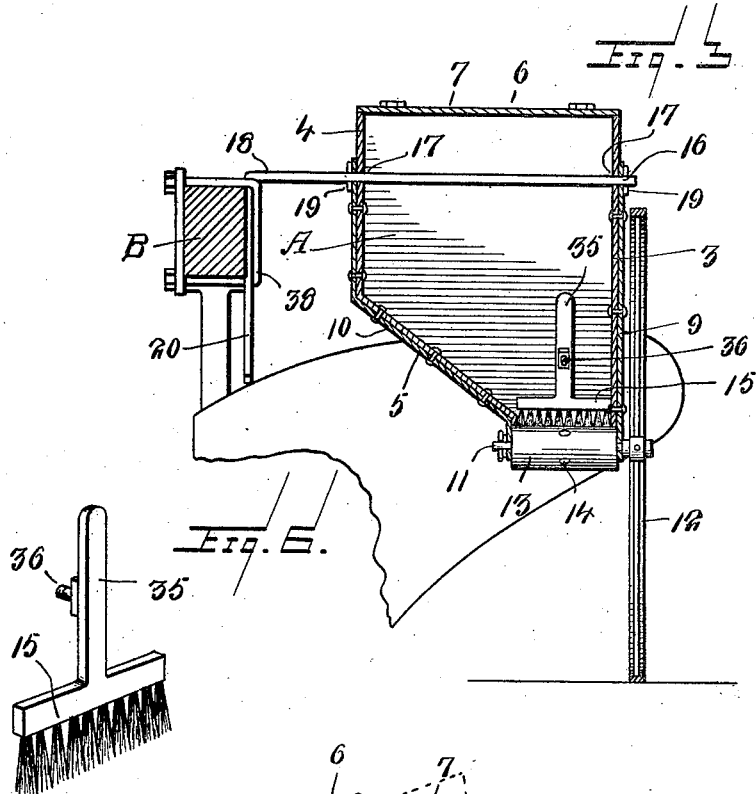
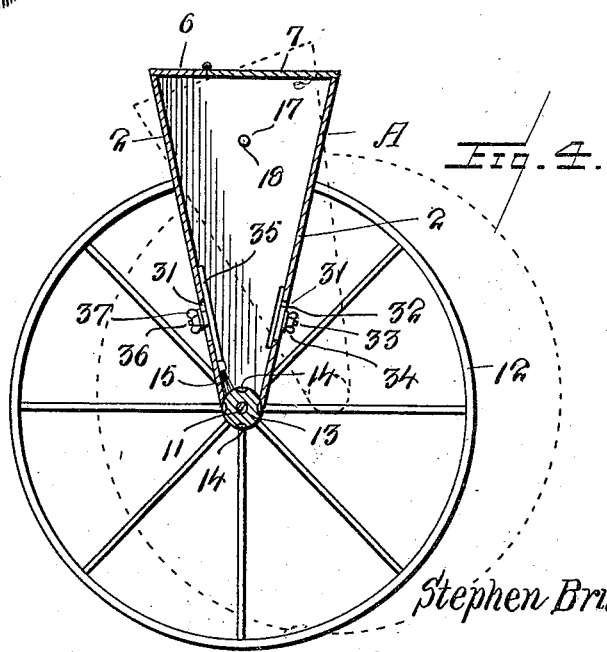
Inventor
Stephen Bruckman
By Victor J. Evans
Attorney
Witnesses

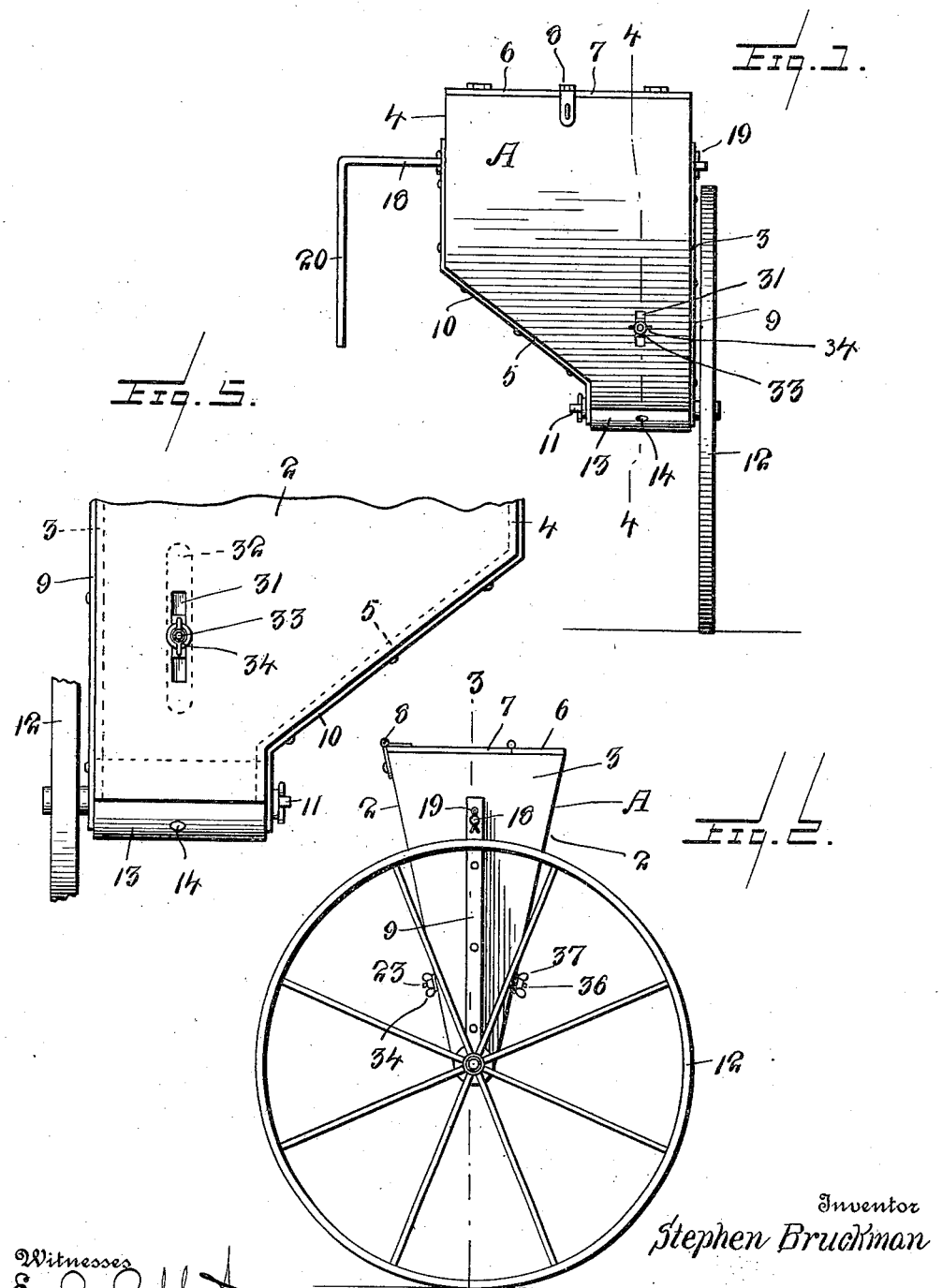

UNITED STATES PATENT OFFICE.

STEPHEN BRUCKMAN, OF LEBANON, PENNSYLVANIA.

SEED-PLANTER.

1,083,185.  Specification of Letters Patent.  Patented Dec. 30, 1913.

Application filed December 17, 1912. Serial No. 737,303.

*To all whom it may concern:*

Be it known that I, STEPHEN BRUCKMAN, a citizen of the United States, residing at Lebanon, in the county of Lebanon and State of Pennsylvania, have invented new and useful Improvements in Seed-Planters, of which the following is a specification.

This invention relates to seed planters, and it has for its object to produce a machine of simple and improved construction for planting corn and other seeds, which may be conveniently attached for operation to an ordinary walking plow and used in connection therewith.

A further object of the invention is to produce a wheel supported machine of the class described having a supporting member of special construction, whereby it may be conveniently attached to a plow beam in such a manner as to rock or oscillate upon said supporting member, thereby causing the supporting wheel to engage the ground by gravity, thereby operating the seed dropping mechanism.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings:—Figure 1 is a front view showing the improved seed planter and showing also partly in section a portion of a plow with which it is connected for operation. Fig. 2 is a side elevation of the seed planter, detached. Fig. 3 is a transverse sectional elevation taken substantially on the plane of the line 3—3 in Fig. 4. Fig. 4 is a vertical sectional view taken on the line 4—4 in Fig. 1. Fig. 5 is a detail rear view showing a portion of the seed box or hopper and related parts. Fig. 6 is a perspective detail view of the brush member utilized as a cut-off.

Corresponding parts in the several figures are denoted by like characters of reference.

The hopper A of the improved seed planter is composed of downwardly converging end members 2, 2 and side members, one of which, 3, is vertically disposed, while the other side member includes a vertical upper portion 4 and an inclined lower portion 5. The top 6 of the hopper includes a hingedly supported lid 7 having a hasp or fastening device 8, whereby it may be retained in closed position. The sides of the hopper are provided with braces, one of which, 9, is secured on the side member 3, while the other brace, 10, is secured on the outer faces of the members 4 and 5. The braces 9 and 10 extend downwardly with respect to the members 3 and 5 to afford bearings for a shaft or axle 11 carrying a ground engaging wheel 12. Said axle also carries a seed drum or cylinder 13 having seed cups 14 of suitable size and shape to receive the desired quantity of seed. The end walls 2, 2 of the hopper are each provided with a slot 31, one of said slots being obstructed by a closure 32 secured detachably by means of a bolt 33 having a wing nut 34. The other slot is obstructed by the handle 35 of a cut-off brush 15 which is secured adjustably and detachably by means of a bolt 36 having a wing nut 37. The closure 32 and the cut-off member 15 are interchangeable, the cut-off member being mounted upon the end member which is at the front end of the machine. The necessity for this arises, owing to the fact that the machine is adapted to be used in connection with either a right hand or a left hand plow, the hopper being obviously turned end for end when the machine is transferred from a right hand to a left hand plow, and vice versa. The cut-off brush serves to remove superfluous seeds from the seed cups and to prevent such seeds from being bruised between the drum and the lower edge of the rear wall of the hopper when the machine is in operation.

The upper ends of the braces 9 and 10 are provided with apertures 16 registering with similar apertures 17 in the side members of the hopper, said apertures serving for the passage of a rod or shaft 18 having pins or cotters 19 whereby it is secured against withdrawal, and the hopper is prevented from undue movement longitudinally of the shaft. The other end of the shaft 18 is provided with an arm 20 extending at right angles thereto and adapted to be clamped or secured by means of fastening devices, such as clips 38 on a plow beam, a portion of which appears at B.

In practice, the improved machine or device may be easily and quickly attached to the beam of any ordinary walking plow of either a right hand or the left hand type, the arm 20 of the shaft 18 being securely clamped upon the beam in such a position that the hopper will be supported above the mold board; the downwardly inclined portion 5 of the inner side member being disposed in approximately parallel relation to the mold board and suitably spaced therefrom so as not to interfere with the operation of the plow. The hopper will rock or oscillate on the shaft 18, and the wheel 12 will by gravity engage the ground, being thereby rotated as the plow advances, thus causing the drum 13 to rotate, carrying the seeds contained in the cups or depressions beyond the front wall of the box and depositing the same on the ground in or adjacent to the furrow formed by the plow.

The construction of the improved seed planting device is extremely simple, and it has been found in actual practice to be thoroughly efficient for the purposes for which it is provided. It may be very easily and quickly attached to either a right or left hand plow, or transferred from one side to another of a reversible plow, and by planting seeds at the time of plowing subsequent labor may be avoided.

Having thus described the invention, what is claimed as new, is:—

1. A seed planter having downwardly converging end walls and side walls, one of which includes a downwardly inclined portion, said end walls being provided with slots, a seed drum supported for rotation adjacent to the lower ends of the end and side walls, a closure detachably associated with the slot in one end wall, and a cut-off member adjustably and detachably associated with the slot in the other end member, said closure and cut-off member being interchangeable.

2. A seed planter having downwardly converging end walls and side walls, one of which includes a downwardly inclined portion, said end walls being provided with slots, a seed drum supported for rotation adjacent to the lower ends of the end and side walls, a closure detachably associated with the slot in one end wall, and a cut-off member adjustably and detachably associated with the slot in the other end member, said closure and cut-off member being interchangeable; in combination with a suitably supported shaft on which the hopper may rock.

In testimony whereof I affix my signature in presence of two witnesses.

STEPHEN BRUCKMAN.

Witnesses:
  JOHN WAHL,
  ALBERT G. LIGHT.

---

Copies of this patent may be obtained for five cents each, by addressing the "Commissioner of Patents, Washington, D. C."